(12) United States Patent
Hung et al.

(10) Patent No.: US 8,384,801 B2
(45) Date of Patent: Feb. 26, 2013

(54) SCENE-DEPENDENT AUTO EXPOSURE CONTROL

(75) Inventors: Szepo Robert Hung, Carlsbad, CA (US); Hsiang-Tsun Li, San Diego, CA (US); Jingqiang Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 908 days.

(21) Appl. No.: 11/831,612

(22) Filed: Jul. 31, 2007

(65) Prior Publication Data

US 2009/0033764 A1 Feb. 5, 2009

(51) Int. Cl.
*H04N 5/235* (2006.01)
(52) U.S. Cl. .................................. 348/229.1
(58) Field of Classification Search .......... 348/229.1, 348/230.1, 207.9, 222.1
See application file for complete search history.

(56) References Cited

U.S. PATENT DOCUMENTS

| | | | |
|---|---|---|---|
| 5,949,962 A * | 9/1999 | Suzuki et al. | 358/1.9 |
| 6,836,288 B1 | 12/2004 | Lewis | |
| 6,836,588 B1 | 12/2004 | Zeng | |
| 2007/0070216 A1 | 3/2007 | Yabe | |
| 2007/0080975 A1 * | 4/2007 | Yamashita et al. | 345/591 |
| 2007/0133071 A1 * | 6/2007 | Noyes et al. | 358/516 |
| 2007/0165120 A1 | 7/2007 | Takane | |

FOREIGN PATENT DOCUMENTS

| | | |
|---|---|---|
| JP | 2000069490 | 3/2000 |
| JP | 2005051593 | 2/2005 |

OTHER PUBLICATIONS

European Search Report—European Patent Office—EP08006401, European Patent Search—The Hague—Jan. 15, 2009.
International Search Report—PCT/US08/071840, International Search Authroity—European Patent Office—Jan. 21, 2009.
Written Opinion—PCT/US08/071840, International Search Authroity—European Patent Office—Jan. 21, 2009.
Taiwan Search Report—TW097129099—TIPO—Feb. 13, 2012.

* cited by examiner

*Primary Examiner* — Aung S Moe
(74) *Attorney, Agent, or Firm* — James R. Gambale, Jr.

(57) ABSTRACT

A device has a processing unit to implement a set of operations to use both luma and chroma information from a scene of an image to dynamically adjust exposure time and sensor gain. The processing unit collects bright near grey pixels and high chroma pixels in the scene. Based on the collected pixels, brightness of the near grey pixels is increased to a predetermined level without saturation. At the same time, the high chroma pixels are kept away from saturation.

33 Claims, 12 Drawing Sheets

SCENE-DEPENDENT AUTO EXPOSURE CONTROL

BACKGROUND

I. Field

The present disclosure relates generally to the field of image processing and, more specifically, to techniques for auto exposure control that are scene-dependent.

II. Background

Auto Exposure Control (AEC) is the process to automatically adjust exposure time and sensor gain to reach a pleasing/preferred image quality, especially brightness. Most cameras (including camera phones) use a fixed luma target for the AEC adjustment (e.g., to minimize the difference between a frame-luma and a pre-defined luma target). However, psychophysical experiments show that the most preferred images may have a very different luma target. Thus, a fixed luma target does not work well for all scenes.

Currently, most cameras are using a fixed luma target for the AEC adjustment. Some advanced cameras such as digital single-lens reflex (DSLR) or professional cameras have their own proprietary database about setting the exposure level (i.e., EV0). However, even these kinds of cameras do not provide a preferred exposure control based on psychophysical experiments.

Based on psychophysical experiments, a fixed target for AEC adjustment is not an optimal method for such adjustment.

Other cameras may adjust a luma target according to the scene's brightness level. However, this process still does not produce an image to match the human preference.

SUMMARY

Techniques for auto exposure control that are scene-dependent are described herein. In one configuration, a device comprises a processing unit that implements a set of operations to use both luma and chroma information from a scene of an image to dynamically adjust exposure time and sensor gain. The device has a memory coupled to the processing unit.

In another configuration, an integrated circuit comprises a processing unit that implements a set of operations to use both luma and chroma information from a scene of an image to dynamically adjust exposure time and sensor gain, and a memory coupled to the processing unit.

In a further configuration, a computer program product is provided. The computer program product includes a computer readable medium having instructions for causing a computer to determine luma and chroma information from a scene of an image, and to dynamically adjust exposure time and sensor gain based on both the luma and chroma information.

Additional aspects will become more readily apparent from the detailed description, particularly when taken together with the appended drawings

BRIEF DESCRIPTION OF THE DRAWINGS

Aspects and configurations of the disclosure will become more apparent from the detailed description set forth below when taken in conjunction with the drawings in which like reference characters identify corresponding elements throughout.

Figure 1:
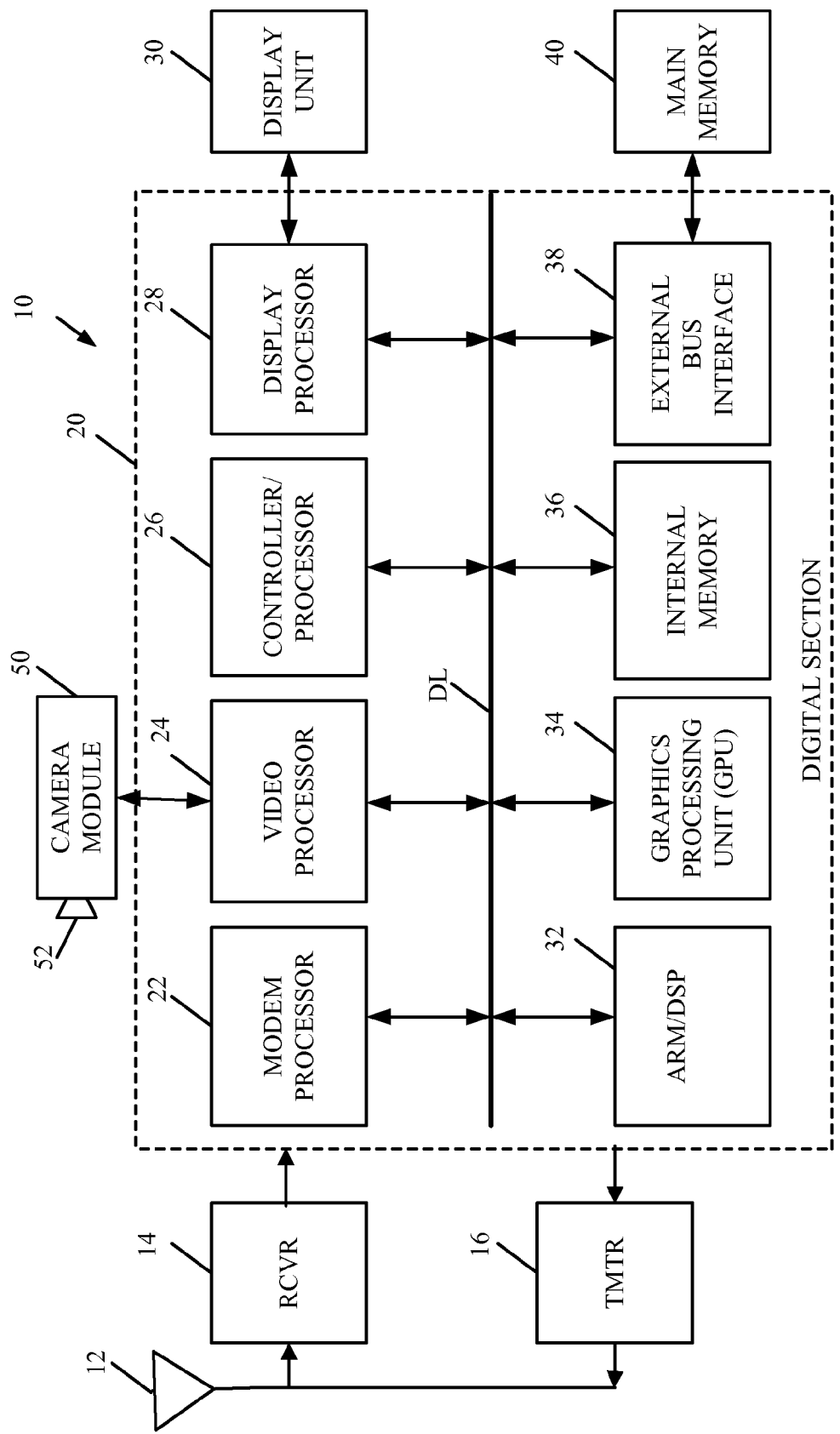
FIG. 1 shows a block diagram of a wireless device.

The images in the drawings are simplified for illustrative purposes and are not depicted to scale. To facilitate understanding, identical reference numerals have been used, where possible, to designate identical elements that are common to the figures, except that suffixes may be added, when appropriate, to differentiate such elements.

The appended drawings illustrate exemplary configurations of the invention and, as such, should not be considered as limiting the scope of the invention that may admit to other equally effective configurations. It is contemplated that features or steps of one configuration may be beneficially incorporated in other configurations without further recitation.

DETAILED DESCRIPTION

The word "exemplary" is used herein to mean "serving as an example, instance, or illustration." Any configuration or design described herein as "exemplary" is not necessarily to be construed as preferred or advantageous over other configurations or designs.

The techniques described herein may be used for wireless communications, computing, personal electronics, etc. with a built-in camera module. An exemplary use of the techniques for wireless communication is described below.

FIG. 1 shows a block diagram of a configuration of a wireless device 10 in a wireless communication system. The wireless device 10 may be a cellular or camera phone, a terminal, a handset, a personal digital assistant (PDA), or some other device. The wireless communication system may be a Code Division Multiple Access (CDMA) system, a Global System for Mobile Communications (GSM) system, or some other system.

The wireless device 10 is capable of providing bi-directional communications via a receive path and a transmit path. On the receive path, signals transmitted by base stations are received by an antenna 12 and provided to a receiver (RCVR) 14. The receiver 14 conditions and digitizes the received signal and provides samples to a digital section 20 for further processing. On the transmit path, a transmitter (TMTR) 16 receives data to be transmitted from the digital section 20, processes and conditions the data, and generates a modulated signal, which is transmitted via the antenna 12 to the base stations.

The digital section 20 includes various processing, interface and memory units such as, for example, a modem processor 22, a video processor 24, a controller/processor 26, a display processor 28, an ARM/DSP 32, a graphics processing unit (GPU) 34, an internal memory 36, and an external bus interface (EBI) 38. The modem processor 22 performs processing for data transmission and reception (e.g., encoding, modulation, demodulation, and decoding). The video processor 24 performs processing on video content (e.g., still images, moving videos, and moving texts) for video applications such as camcorder, video playback, and video conferencing. A camera module 50 with a lens 52 is coupled to the video processor 24 for capturing the video content. The controller/processor 26 may direct the operation of various processing and interface units within digital section 20. The display processor 28 performs processing to facilitate the display of videos, graphics, and texts on a display unit 30. The ARM/DSP 32 may perform various types of processing for the wireless device 10. The graphics processing unit 34 performs graphics processing.

The techniques described herein may be used for any of the processors in the digital section 20, e.g., the video processor 24. The internal memory 36 stores data and/or instructions for various units within the digital section 20. The EBI 38 facilitates the transfer of data between the digital section 20 (e.g., internal memory 36) and a main memory 40 along a bus or data line DL.

The digital section 20 may be implemented with one or more DSPs, micro-processors, RISCs, etc. The digital section 20 may also be fabricated on one or more application specific integrated circuits (ASICs) or some other type of integrated circuits (ICs).

The techniques described herein may be implemented in various hardware units. For example, the techniques may be implemented in ASICs, DSPs, RISCs, ARMs, digital signal processing devices (DSPDs), programmable logic devices (PLDs), field programmable gate arrays (FPGAs), processors, controllers, micro-controllers, microprocessors, and other electronic units.

Figure 2:
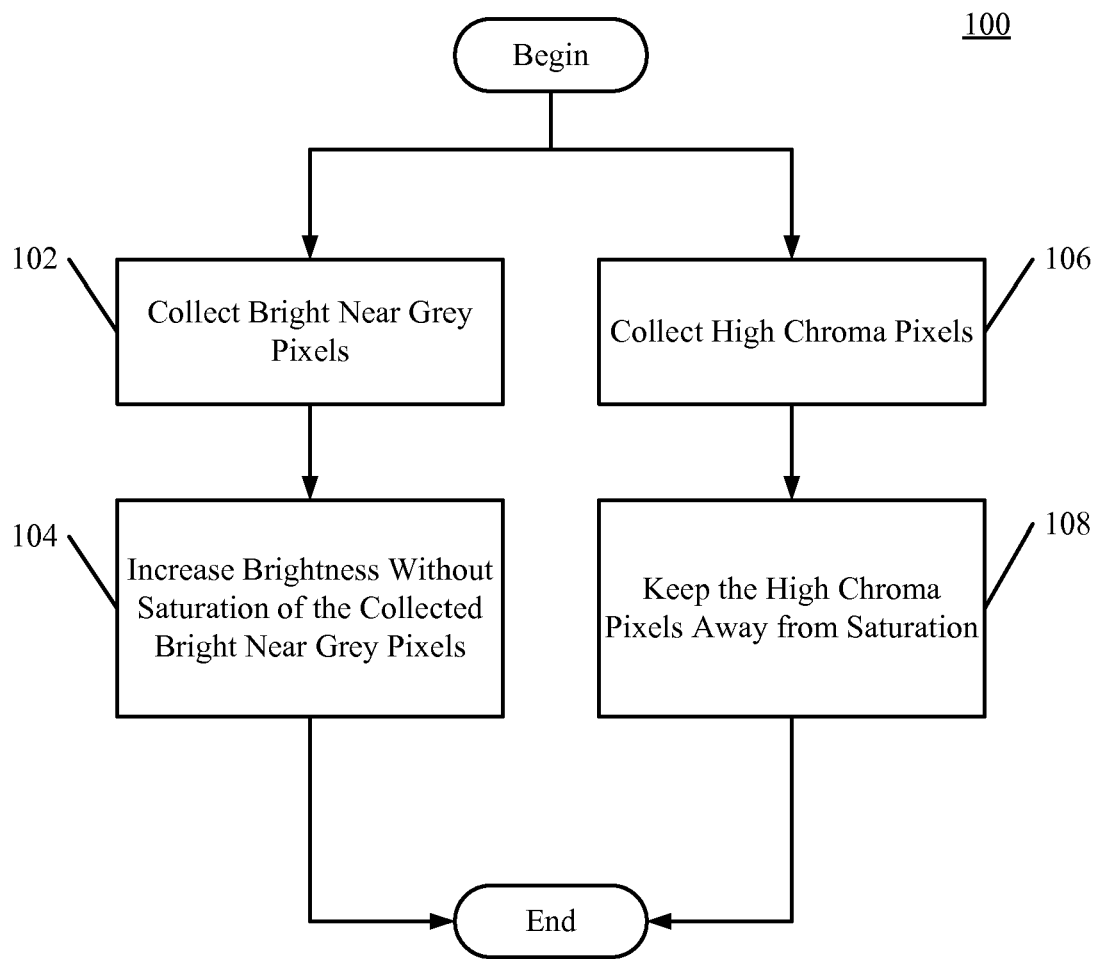
FIG. 2 shows a high-level flow diagram of a scene-dependent auto exposure control method.

FIG. 2 shows a high-level flow diagram of a scene-dependent auto exposure control method 100. The scene-dependent auto exposure control method 100 begins at block 102 where bright near grey pixels of an original image are collected. Block 102 is followed by block 104 where the brightness of the collected bright near grey pixels is increased to a certain level without saturation. Block 104 ends the method.

In series, parallel or contemporaneously with blocks 102 and 104, the operations of blocks 106 and 108 are performed. At block 106, the high chroma pixels are collected. This may be performed at the same time (e.g., in parallel or contemporaneously) as the bright near grey pixels are collected. Block 106 is followed by block 108 where the high chroma pixels are kept way from saturation. Block 108 ends the method.

Saturation generally refers to those pixels that have reached the maximum allowable numerical range. For example, for 8-bit pixels, a value of 255 is the maximum. When a pixel has reached 255 for 8-bit space, the pixel is considered saturated.

For some pixels which are saturated and thus have reached their maximum capacity, their pixel values maybe clipped. By considering that the image processing on raw data typically has gains greater than 1, saturation easily occurs even if the raw data is not. Appropriate exposure time and analog gain from heuristic should be applied to the sensor to avoid saturation.

Figure 3A:
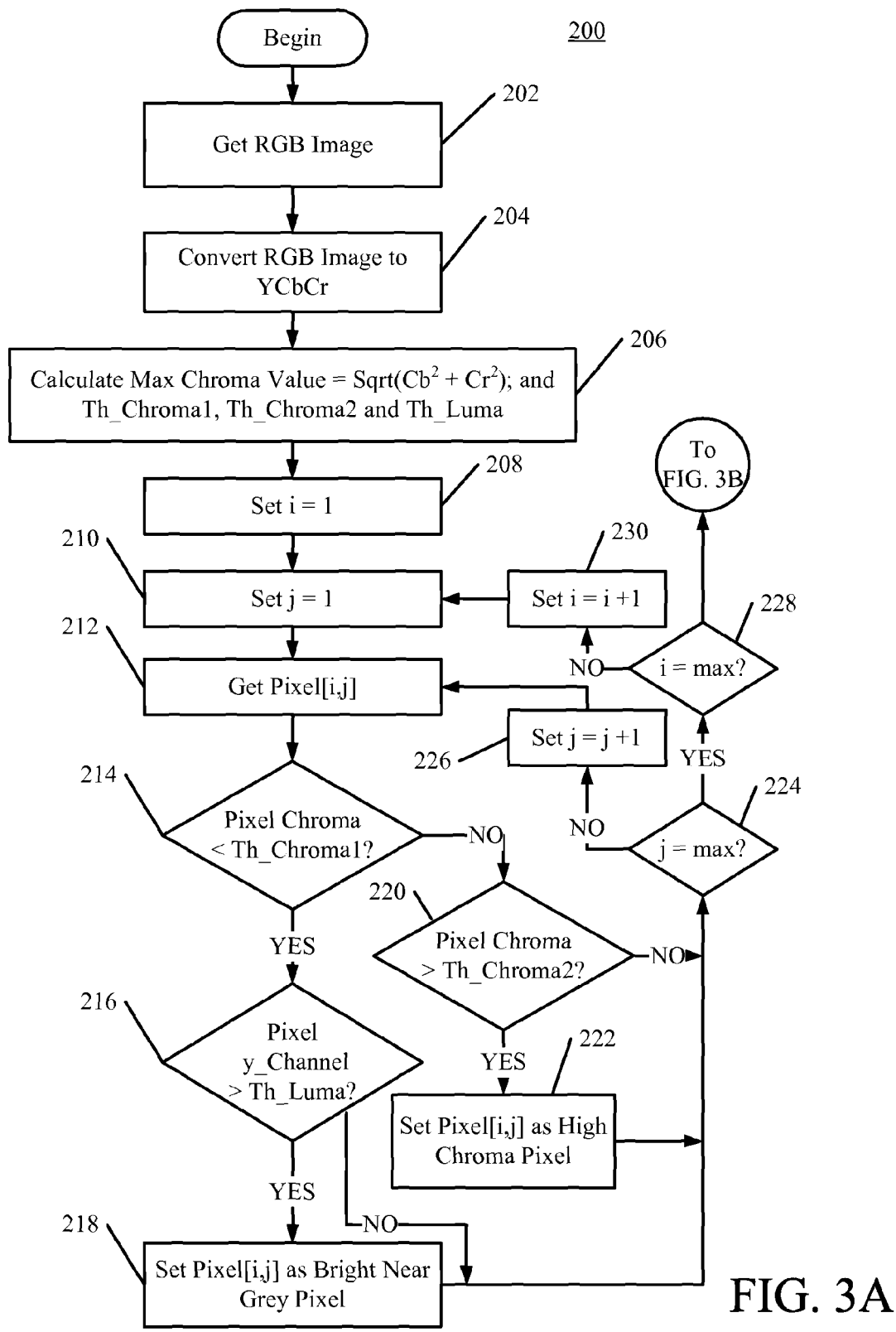
FIGS. 3A and 3B show a flow diagram of the scene-dependent auto exposure control method.
Figure 3B:
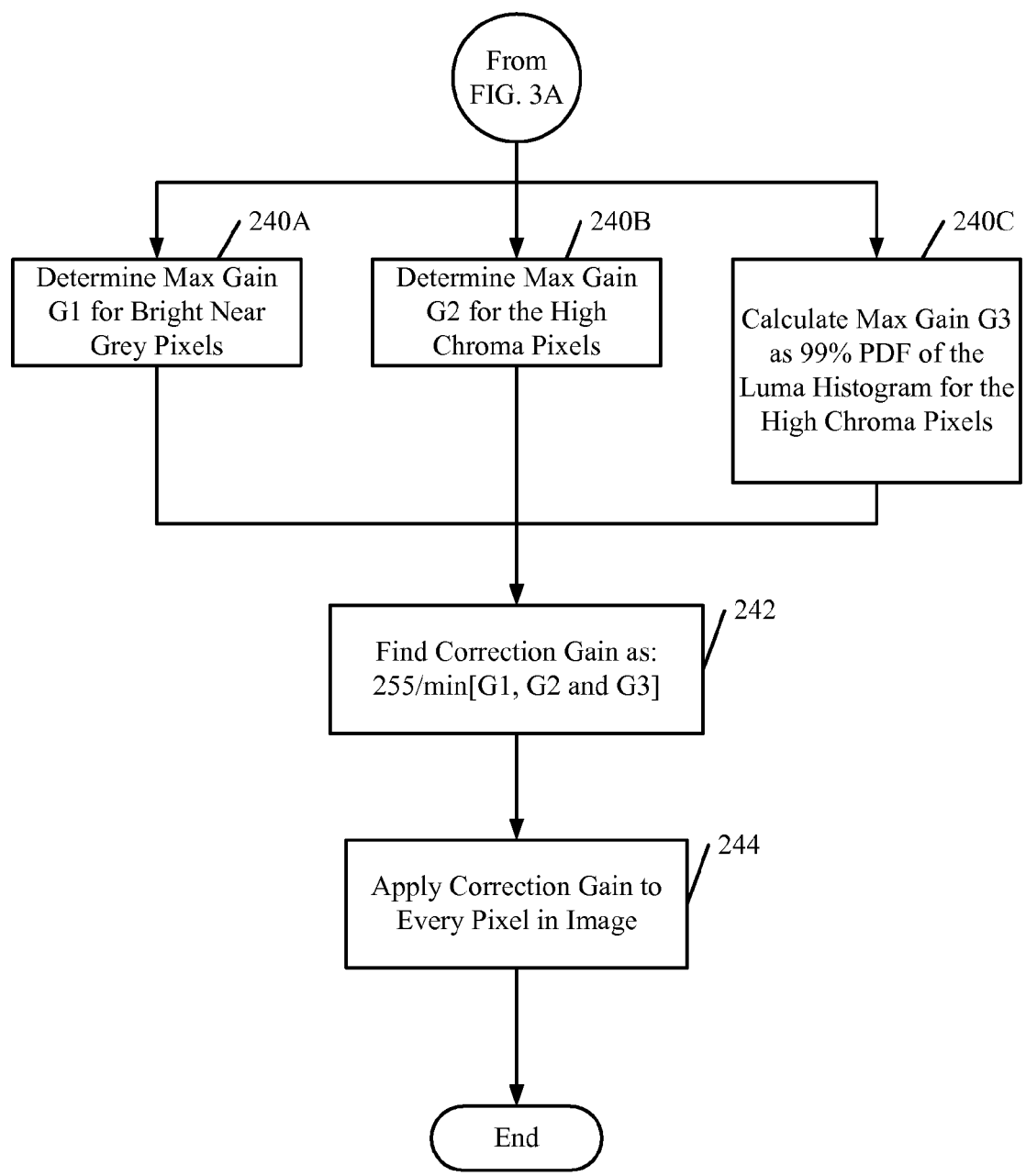

FIGS. 3A-3B show a flow diagram of the scene-dependent auto exposure control method 200. The scene-dependent auto exposure control method 200 is but one detailed example for carrying out the scene-dependent auto exposure control method 100. The description of the scene-dependent auto exposure control method 200 will be described in combination with FIGS. 4A-4E.

Figure 4A:
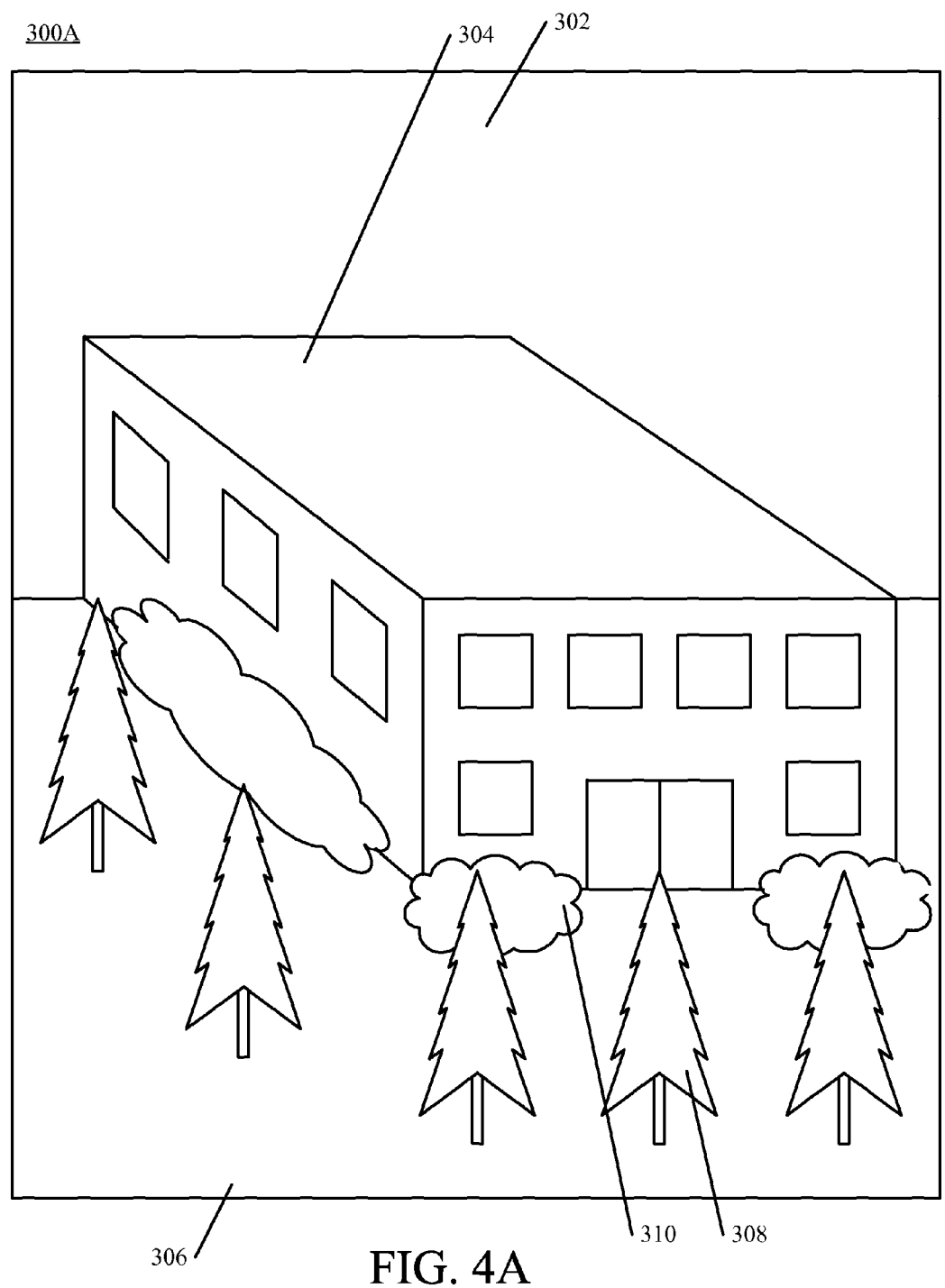
FIG. 4A shows an original final image.

The scene-dependent auto exposure control method 200 begins at block 202 where an original final image is obtained. FIG. 4A shows an original final image 300A. In the exemplary configuration, the original final image is an RGB image. The original final image 300A includes a sky area 302, a building 304, a ground area 306, a plurality of trees 308 and a plurality of bushes 310.

Block 202 is followed by block 204 where the red, green blue (RGB) image (original final image 300A) is converted to YCbCr color space. As is known, "YCbCr" is one of two primary color spaces used to represent digital component video. The other color space is RGB. The difference between YCbCr and RGB is that the YCbCr color space represents color as brightness and two color difference signals. However, the RGB color space represents color as red, green and blue. In the YCbCr color space, the Y is the brightness (luma), the Cb is blue minus luma (B-Y) and the Cr is red minus luma (R-Y).

Block 204 is followed by block 206 where a maximum chroma value (Max_Chroma_Value) and Max luma value (Max_Luma_Value) are calculated according to equation Eq. (1A) and Eq. (1B)

$$Th\_Chroma\_Value = \max[\sqrt{(Cb^2 + Cr^2)}]; \text{ and} \quad (1A)$$

$$Max\_Luma\_Value = \max[Y] \quad (1B).$$

Additionally, a first chroma threshold (Th_Chroma1), a second chroma threshold (Th_Chroma2) and a luma threshold (Th_Luma) are calculated according to equations Eq. (2), Eq. (3) and Eq. (4)

$$Th\_Chroma1 = F1 * Max\_Chroma\_Value; \quad (2)$$

$$Th\_Chroma2 = F2 * Max\_Chroma\_Value; \text{ and} \quad (3)$$

$$Th\_Luma = F3 * Max\_Luma\_Value; \quad (4)$$

where the factor F1 of equation Eq. (2) is a lower percentage (e.g., 10%) of the value of equation Eq. (1A); the factor F2 of equation Eq. (3) is an upper percentage (e.g., 60%) of the value of equation Eq. (1A); and the factor F3 of equation Eq. (4) is a percentage (e.g., 70%) of the value of equation Eq. (1B). These factors are examples and may changed based on preferences and/or scenes. In the exemplary configuration, one or all of the factors F1, F2 and F3 are adjustable by the user based on the user's preferences.

After block 206, the bright near grey pixels and the high chroma pixels are collected from the converted image. The collection phase begins with block 208 where an index i is set equal to 1. Block 208 is followed by block 210 where an index j is set equal to 1. Block 210 is followed by block 212 where Pixel[i,j] is obtained to determine if it is a bright near grey pixel or a high chroma pixel.

Block 212 is followed by block 214 where a determination is made where the chroma of Pixel[ij] is less than Th_Chroma1. If the determination at block 214 is "Yes," block 214 is followed by block 216 where a determination is made where the y_channel (luma) of Pixel[ij] is greater than Th_Luma. If the determination at block 216 is "Yes," then the Pixel[ij] is set or collected as a bright near grey pixel of the image. Then, the process loops to block 224 to get the next pixel in the converted image.

Returning again to block 216, if the determination at block 216 is "No," (meaning the Pixel[i,j] is not a bright near grey pixel of the image) then the process loops to block 224 to get the next pixel in the converted image.

Returning again to block 214, if the determination at block 214 is "No," (meaning the Pixel[i,j] is not a bright near grey pixel of the image) then the block 214 is followed by block 220 to determine if the chroma of the Pixel[ij] is greater than Th_Chroma2. If the determination at block 220 is "Yes," the Pixel[ij] is set or collected as a high chroma pixel. Then, the process loops to block 224 to get the next pixel in the converted image. However, if the determination at block 220 is "No," (meaning the Pixel[ij] is not a high chroma pixel) then the process loops to block 224 to get the next pixel in the converted image.

At block 224, a determination is made whether the index j is equal to Max. The index j is used to get the next pixel in a row. If the determination is "No," block 224 is followed by block 226 where the index j is increase by 1. Block 226 returns to block 212 to repeat the collection phase. Returning again to block 224, if the determination at block 224 is "Yes," then block 224 is followed by block 228. At block 228 a determination is made whether the index i is equal to Max. The index i is used to move to the next row. If the determination is "No," block 228 is followed by block 230 where the index i is increase by 1. Block 230 returns to block 210 to repeat the collection phase. At block 210, the index j is set again to 1.

Returning again to block 228, if the determination is "Yes," the collection phase for determining the bright near grey pixels and the high chroma pixels is complete. Blocks 102 and 106 of method 100 (FIG. 2) correlate to the collection phase. Examples of the results from the collection phase are shown in FIGS. 4B, 4C, and 4E.

Figure 4B:
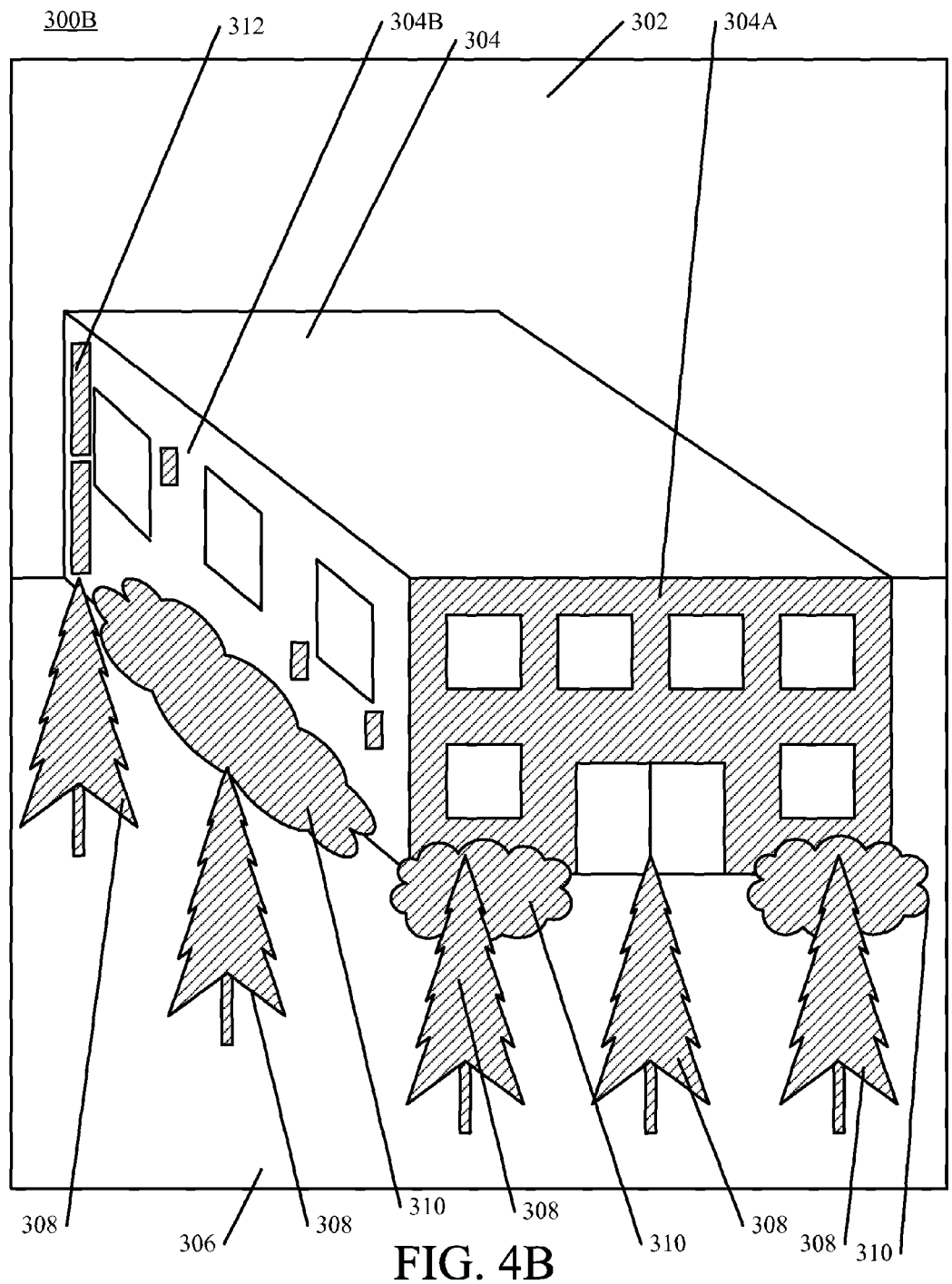
FIG. 4B shows the original final image of FIG. 4A with those pixel or pixel areas having a chroma less than Th_Chroma1 depicted in cross hatch.

FIG. 4B shows the original final image of FIG. 4A with those pixel or pixel areas having a chroma less than Th_Chroma1 depicted in cross hatch. This image in FIG. 4B is denoted as 300B. The image 300B represents those pixels determined at block 214 as having a chroma less than Th_Chroma1 (first chroma threshold). In this example, those pixels or pixel areas include all trees 308, bushes 310 and the front face or wall 304A of the building 304. A side wall 304B of the building has only patches of pixels meeting the criteria of block 214 and are denoted as 312. In this example, the sky 302 and ground 306 do not have any pixels meeting block 214. In FIG. 4B the first chroma threshold Th_Chroma1 is less than 5.7.

Figure 4C:
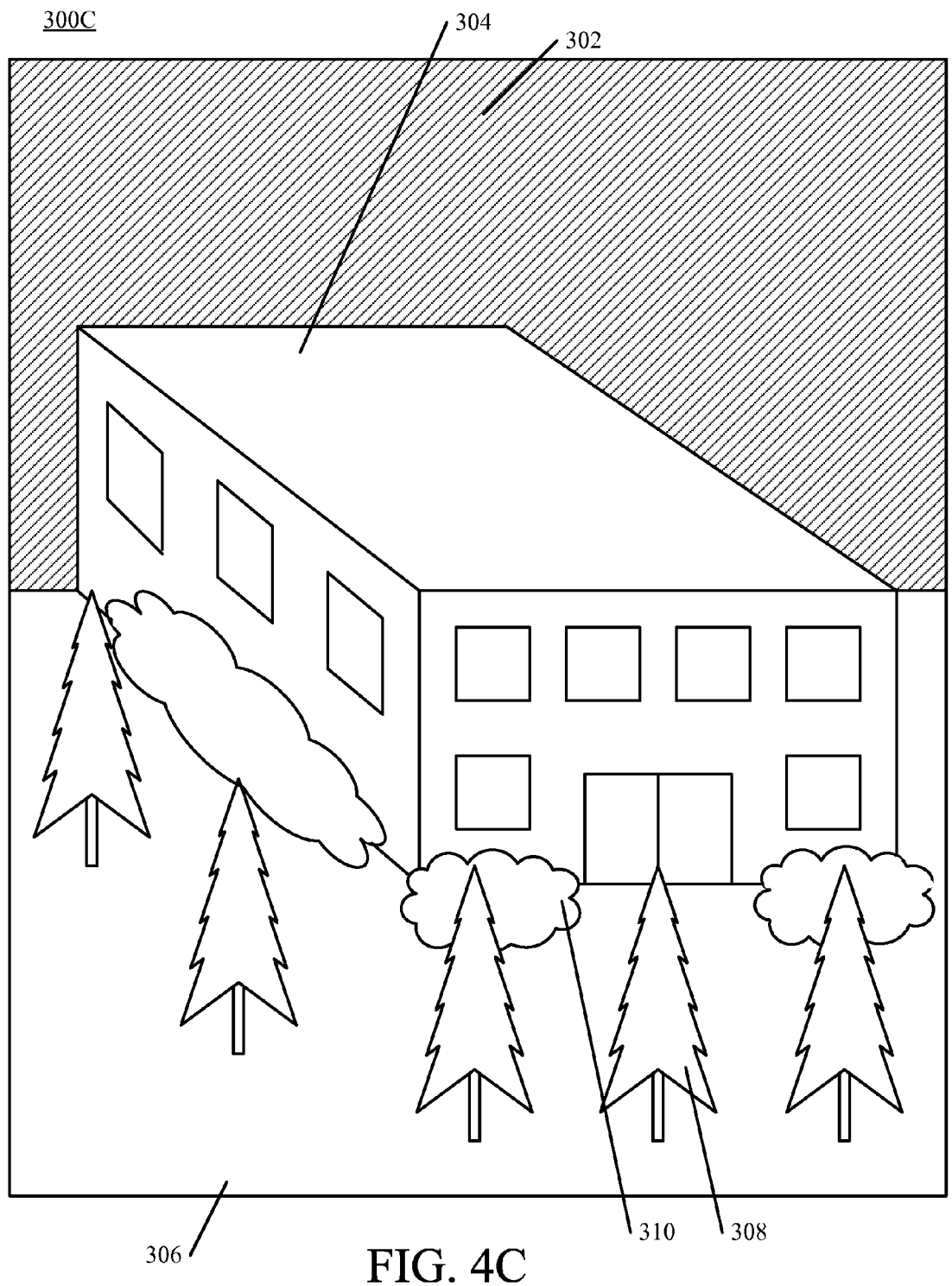
FIG. 4C shows the original final image of FIG. 4A with those pixel or pixel areas having a chroma greater than Th_Chroma2 depicted in cross hatch.

FIG. 4C shows the original final image of FIG. 4A with those pixel or pixel areas having a chroma greater than Th_Chroma2 depicted in cross hatch. This image in FIG. 4C is denoted as 300C. The image 300C represents those pixels determined at block 222 as having a chroma greater than Th_Chroma2 (second chroma threshold) and set as the high chroma pixels. In this example, those pixels or pixel areas include the sky 302. In FIG. 4B, the second chroma threshold Th_Chroma2 is greater than 34.5.

Figure 4D:
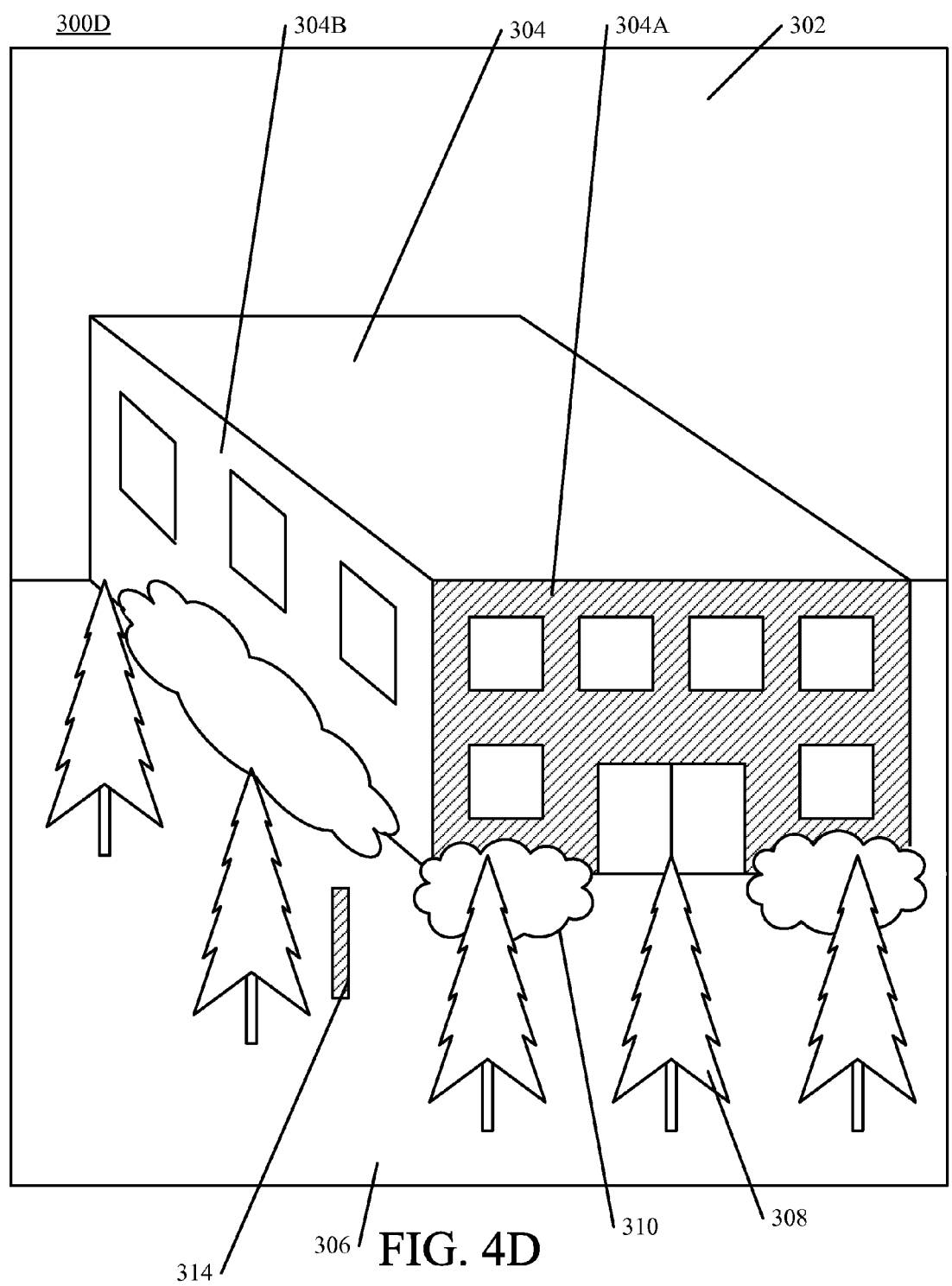
FIG. 4D shows the original final image of FIG. 4A with those pixel having a luma greater than Th_Luma depicted in cross hatch.
Figure 4E:
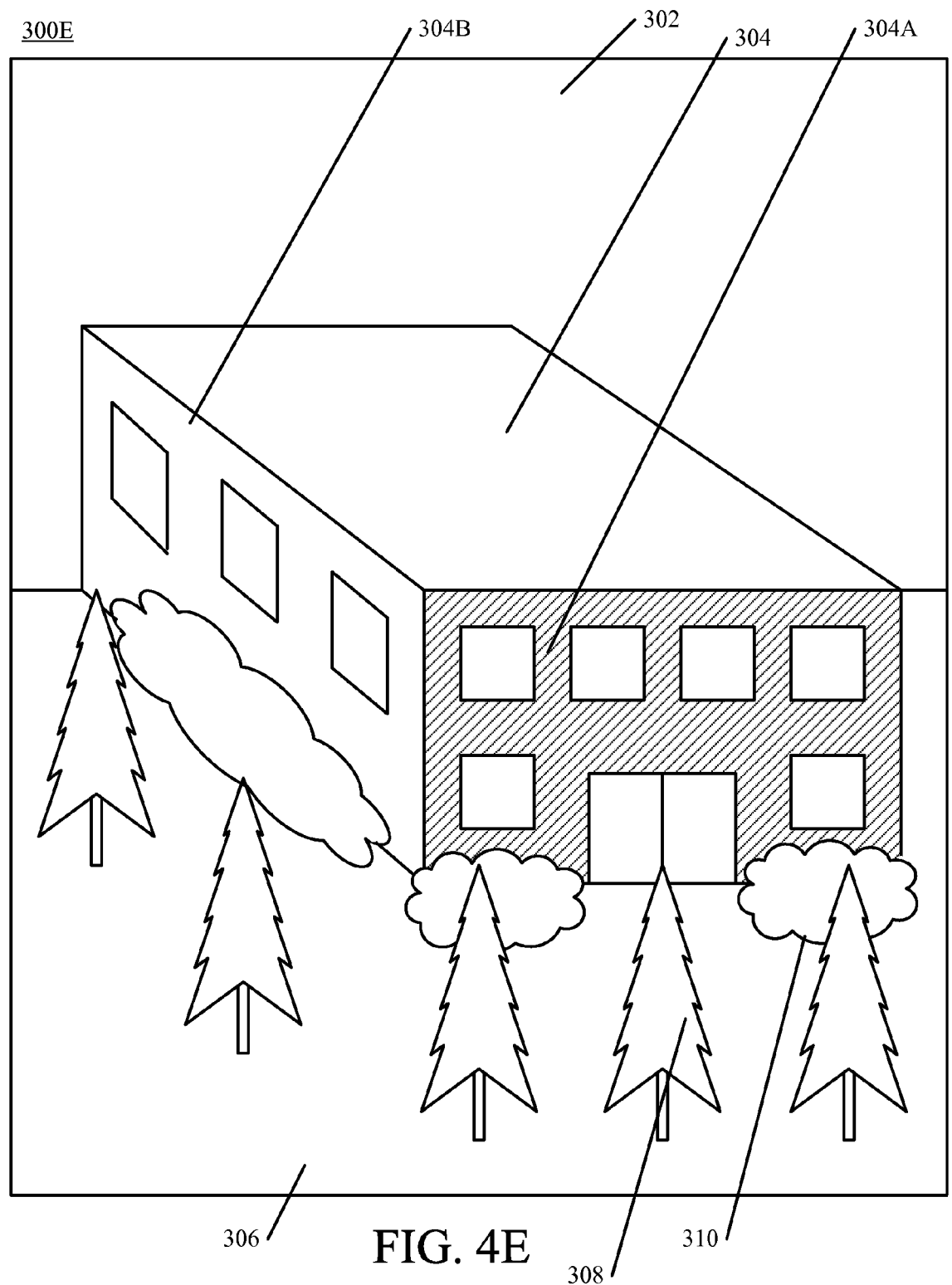
FIG. 4E shows the original final image of FIG. 4A with those pixel having a chroma less than Th_Chroma1 and a luma greater than Th_Luma depicted in cross hatch.
Figure 5:
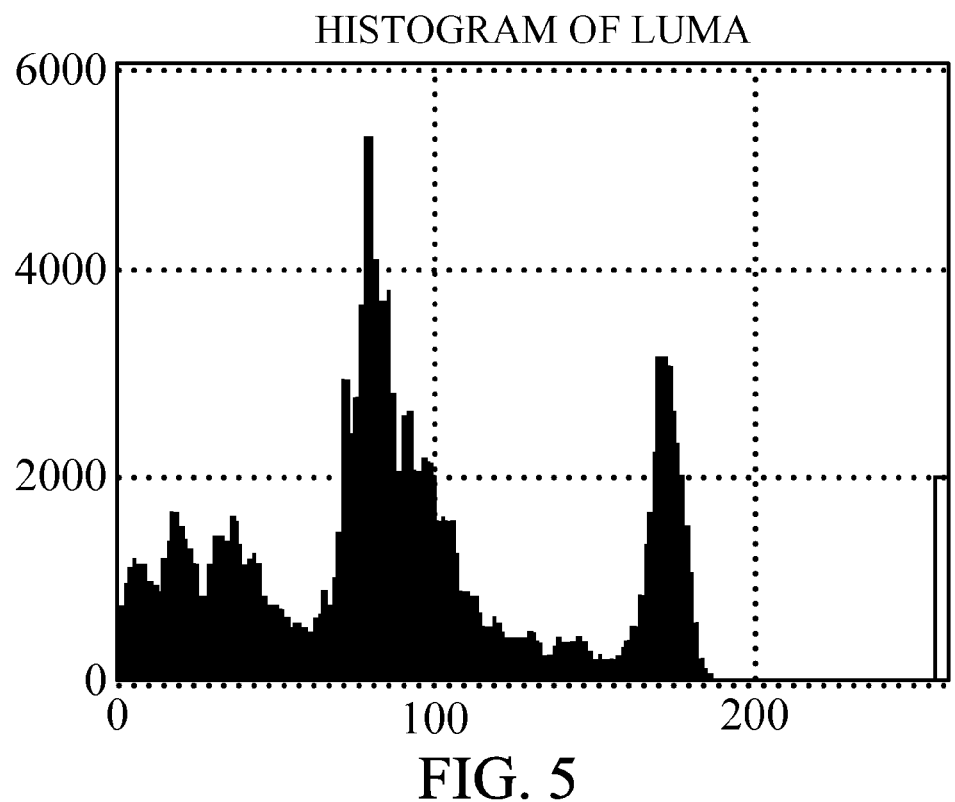
FIG. 5 shows a graph of the histogram of luma of the original final image of FIG. 4A.
Figure 6:
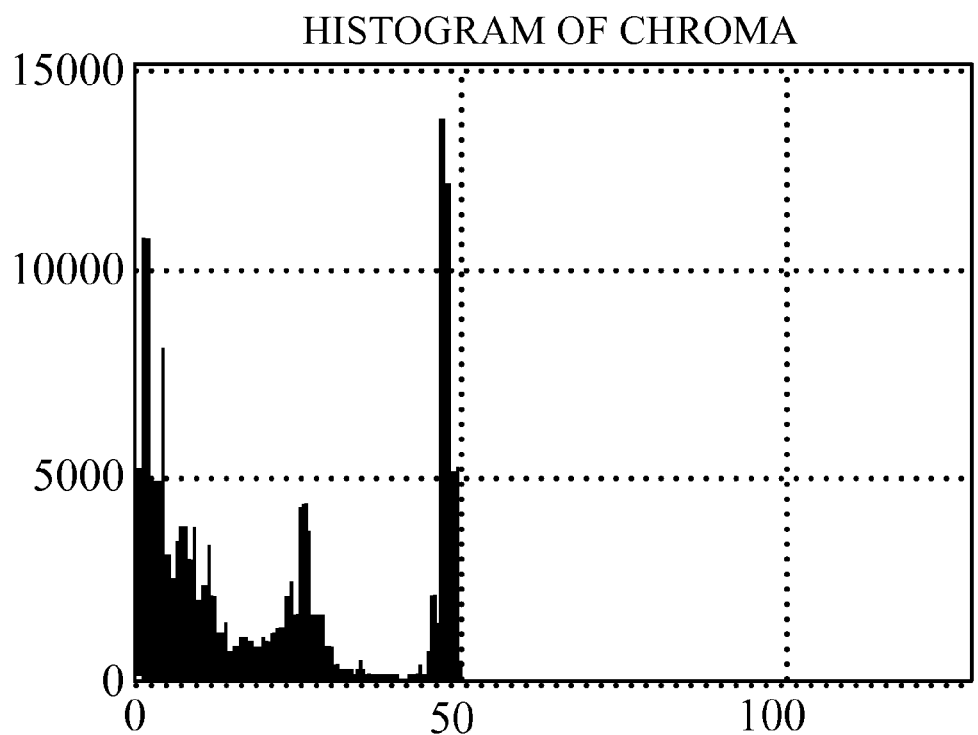
FIG. 6 shows a graph of the histogram of chroma of the original final image of FIG. 4A.

FIG. 4D shows the original final image of FIG. 4A with those pixel having a luma greater than Th_Luma depicted in cross hatch. This image in FIG. 4D is denoted as 300D. The image 300D represents those pixels having a luma greater than Th_Luma (luma threshold). In this example, the front face or wall 304A of the building 304 and a patch of pixels denoted as 314 located beside one of the trees 308. As can be readily seen, this image 300D is not a result of the collection phase. It is used only for comparison. In FIG. 4D, the luma threshold Th_Luma is greater than 156.1.

FIG. 4E shows the original final image of FIG. 4A with those pixel having a chroma less than Th_Chroma1 and a luma greater than Th_Luma depicted in cross hatch. This image in FIG. 4E is denoted as 300E. The image 300E represents those pixels set as bright near grey pixels in block 218. In this example, the front face or wall 304A of the building 304 meet both criteria of being less than Th_Chroma1 (first chroma threshold) and greater than Th_luma (luma threshold). As a comparison between FIGS. 4B and 4D, only the common area(s) of FIGS. 4B and 4D are shown cross hatched in FIG. 4E.

Returning again to FIGS. 3A and 3B, at block 228, if the determination is "Yes," (meaning the collection phase for determining the bright near grey pixels and the high chroma pixels is complete) then block 228 is followed by blocks 240A, 240B, 240C of FIG. 3B. Blocks 240A, 240B and 240C are shown in parallel. Alternatively, these blocks 240A, 240B and 240C may be performed in series or contemporaneously, instead of in parallel.

At block 240A, a Max gain G1 for the collected bright near grey pixels is determined according to equation Eq. (5)

$$G1 = \max[\text{luma value of the collected bright near grey pixels}] \quad (5).$$

At block 240B, a Max gain G2 for the collected high chroma pixels is determined according to equation Eq. (6)

$$G2 = \max[\text{luma value of the collected high chroma pixels}] \quad (6).$$

The max gains G1 and G2 may be determined by ranking the list of the collected bright near grey pixels or the collected high chroma pixels by luma values.

At block 240C, a Max gain G3 is calculated according to equation Eq. (7)

$$G3 = \text{value that gives F5\% of the accumulated PDF of the luma histogram of the collected high chroma pixels} \quad (7),$$

where F5% is a percentage (e.g. 99%) of the PDF; and the PDF is the probability distribution function. In the exemplary configuration, the value F5% is adjustable based on the user's visual preferences.

Blocks 240A, 240B and 240C are followed by block 242 where a correction gain is calculated according to equation Eq. (8)

$$\text{Correction Gain} = 255/\min[G1, G2, G3] \quad (8)$$

where min[G1, G2, G3] is the minimum of G1, G2 and G3. The correction gain applied to every pixel serves to dynamically adjust exposure time and sensor gain.

Block 242 is followed by block 244 where the correction gain of equation Eq. (8) is applied (multiplied) to every pixel in the original image 300A, FIG. 4A.

As can be appreciated, the blocks 240A, 240B, 240C, 242 and 244 of FIGS. 3A-3B correlate to blocks 104 and 108 of the method 100 in FIG. 2.

Figure 7:
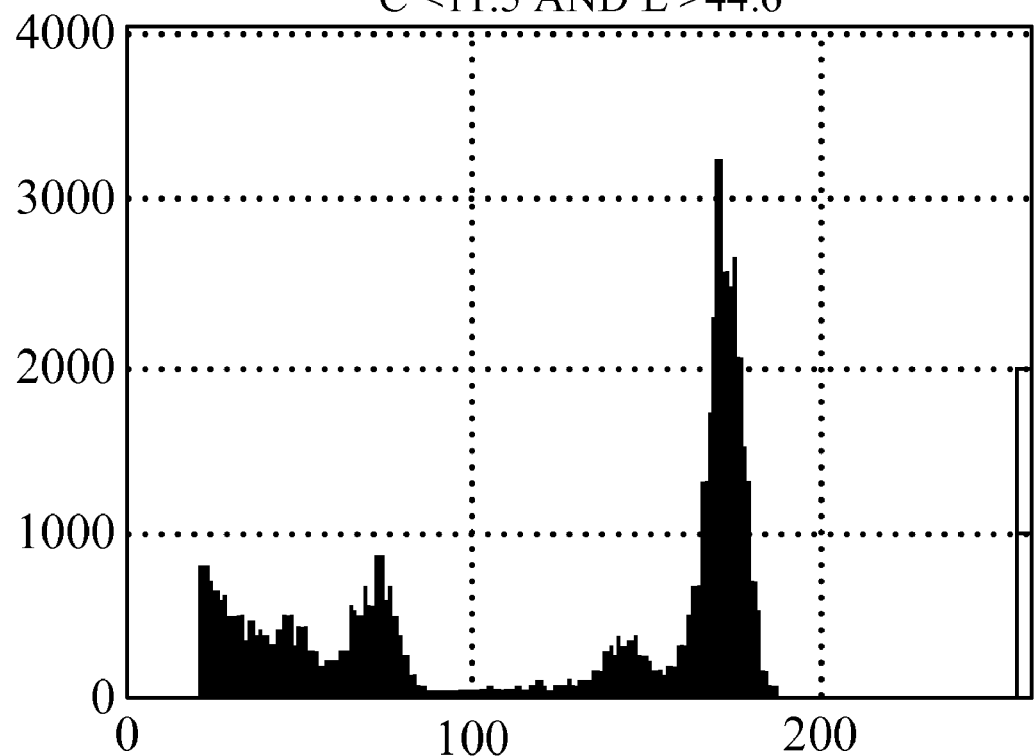
FIG. 7 shows a graph of the histogram of luma of the original final image of FIG. 4A for those pixels meeting a predetermined criteria.

FIG. 7 shows a graph of the histogram of luma of the original final image of FIG. 4A for those pixels meeting a predetermined criteria. In this example, the predetermined criteria is chroma <11.5 and luma >44.6.

Figure 8:
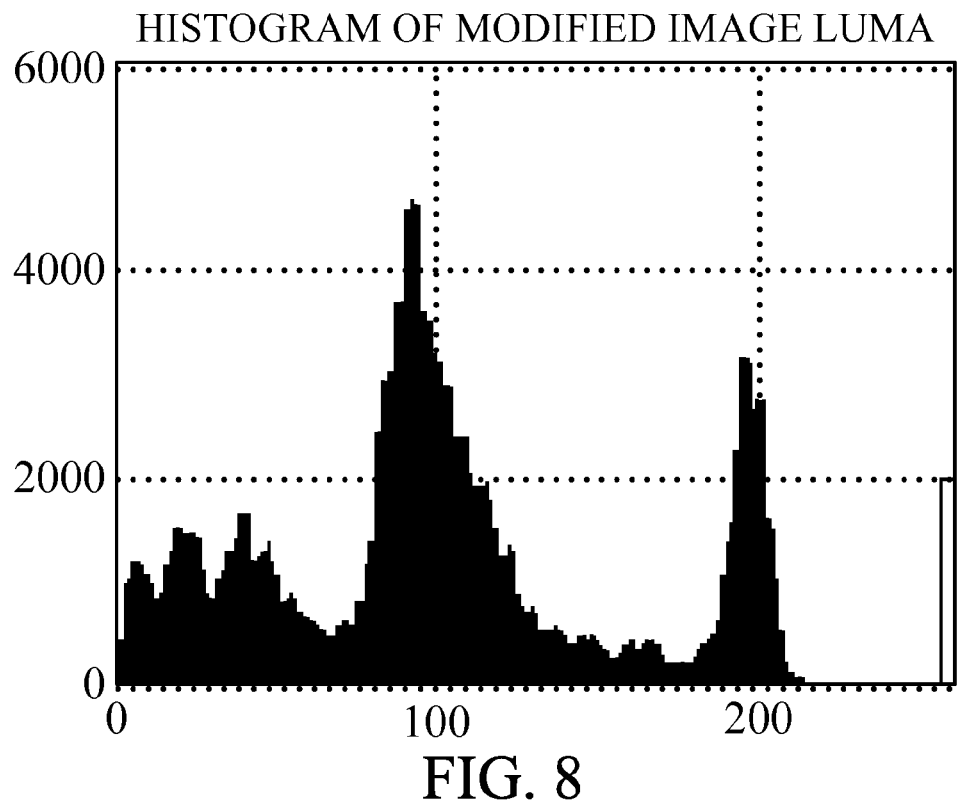
FIG. 8 shows a graph of the histogram of luma for a modified (corrected) image using the scene-dependent auto exposure control method.

FIG. 8 shows a graph of the histogram of luma for a modified (corrected) image using the scene-dependent auto exposure control method 100 or 200.

Figure 9:
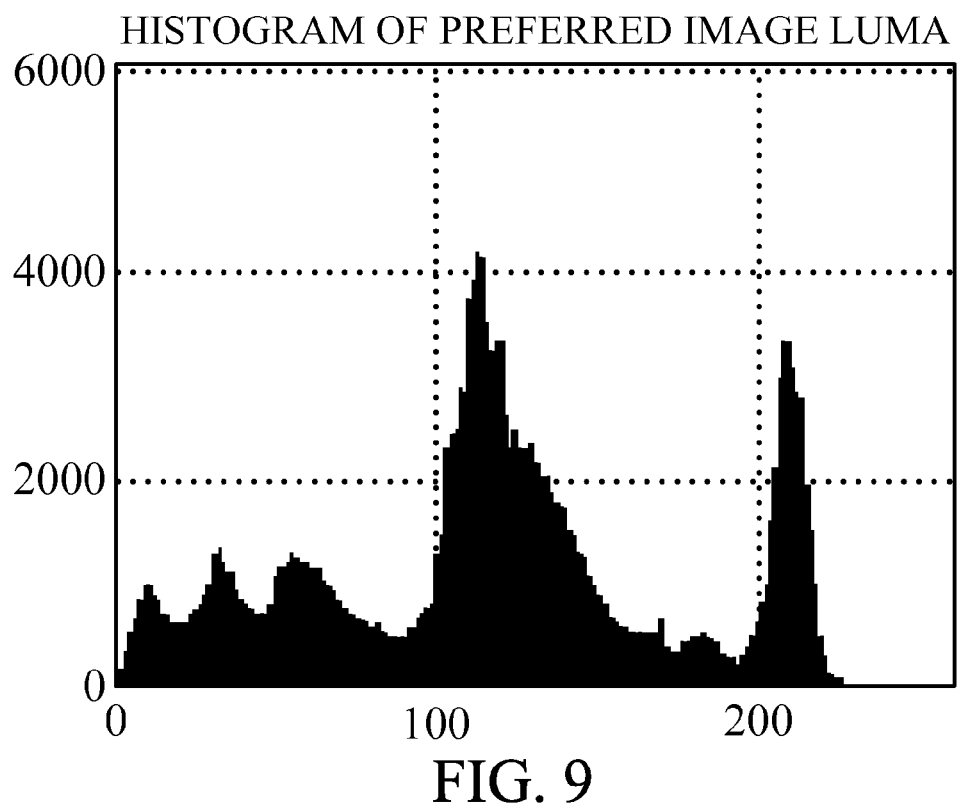
FIG. 9 shows a graph of the histogram of luma for a preferred image.

FIG. 9 shows a graph of the histogram of luma for a preferred image. The preferred image is based on human preference. For example, a series of pictures of the same image is used for comparison basis. A human would visually compare each of the pictures taken in series of the same image and pick one of the pictures as preferred. Based on those results, a preferred image is determined. A comparison of the histogram of luma of FIG. 8 of a modified (corrected) image to the histogram of luma of FIG. 9 of the human preferred image shows that these histograms of luma are closely matched. Accordingly, the modified (corrected) image corrected based on the scene-dependent auto exposure control method 100 or 200 closely matches the human preferred image.

In one or more exemplary configurations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed configurations is provided to enable any person skilled in the art to make or use the disclosure. Various modifications to these configurations will be readily apparent to those skilled in the art, and the generic principles defined herein may be applied to other configurations without departing from the spirit or scope of the disclosure. Thus, the disclosure is not intended to be limited to the configurations shown herein but is to be accorded the widest scope consistent with the principles and novel features disclosed herein.

What is claimed is:

1. A device comprising:
a processing unit to implement a set of operations to use both luma and chroma information from a scene of an image to dynamically adjust exposure time and sensor gain, wherein the set of operations comprises:
collecting a first plurality of pixels based on a luma threshold and a first chroma threshold;
collecting a second plurality of pixels if the chroma associated with each of the second plurality of pixels is greater than a second chroma threshold;
determining a first maximum gain based on at least the first plurality of pixels;
determining a second maximum gain based on at least the second plurality of pixels; and
generating a correction gain based on a minimum of a plurality of values, the plurality of values comprising the first maximum and the second maximum; and
a memory coupled to the processing unit.

2. The device of claim 1, wherein the first plurality of pixels comprises bright near grey pixels and the second plurality of pixels comprises high chroma pixels in the scene, the set of operations further comprising operations to increase brightness to a predetermined level of the near grey pixels without saturation and maintain the high chroma pixels away from saturation.

3. The device of claim 1, wherein the set of operations includes a first subset of operations to convert the image from red, green, blue (RGB) to a YCbCr color space image.

4. The device of claim 3, wherein the set of operations include a second subset of operations to collect bright near grey pixels and high chroma pixels in the YCbCr color space image.

5. The device of claim 4, wherein the set of operations includes a third subset of operations to calculate a first chroma threshold (Th_Chroma1), the second chroma threshold (Th_Chroma2) and a luma threshold (Th_Luma) defined by $$\text{Max\_Chroma\_Value} = \max[\text{Sqrt}(Cb^2 + Cr^2)];$$

$$\text{Max\_Luma\_Value} = \max[Y];$$

$$Th\_Chroma1 = f1 * \text{Max\_Chroma\_Value};$$

$$Th\_Chroma2 = f2 * \text{Max\_Chroma\_Value}; \text{ and}$$

$$Th\_Luma = f3 * \text{Max\_Luma\_Value};$$

where f1 and f2 are predetermined lower and upper percentages of the Max_Chroma_Value; f3 is a predetermined percentage of the Max_Luma_Value; the bright near grey pixels are those pixels in the YCbCr color space image which have a pixel chroma value less than the Th_Chroma1 and a pixel luma greater than the Th_Luma; and the high chroma pixels are those pixels in the YCbCr color space image that have a pixel chroma value that is greater than the Th_Chroma2.

6. The device of claim 5, wherein the set of operations includes a fourth subset of operations to:
determine a maximum gain (G1) based on at least the bright near grey pixels defined by $$G1 = \max[Y \text{ of the bright near grey pixels}];$$

determine a maximum gain (G2) based on at least the high chroma pixels defined by $$G2 = \max[Y \text{ of the high chroma pixels}];$$

calculate a maximum gain (G3) defined by $$G3 = \text{a value that gives F5\% of an accumulated PDF of a luma histogram of the collected high chroma pixels},$$

where F5% is a percentage of the accumulated PDF and PDF is a probability density function;
calculate a correction gain defined by $$\text{Correction Gain} = 255/\min[G1, G2, G3],$$

where min[G1, G2, G3] is the minimum of the G1, the G2 and the G3; and apply the correction gain to every pixel in the YCbCr color space image.

7. The device of claim 1, wherein the processing unit is a portion of a cellular phone, wireless device, wireless communications device, a video game console, a personal digital assistant (PDA), a laptop computer, or a video-enabled device.

8. The device of claim 1, wherein the set of operations comprises collecting the first plurality of pixels if the chroma is less than the first chroma threshold and the luma is greater than the luma threshold in order to collect bright grey pixels.

9. The device of claim 1, wherein the set of operations comprises determining the first maximum gain is made by ranking a list of first plurality of pixels based on luma values.

10. The device of claim 1, wherein the set of operations comprises determining the second maximum gain is made by ranking a list of second plurality of pixels based on luma values.

11. An integrated circuit comprising:
a processing unit to implement a set of operations to use both luma and chroma information from a scene of an image to dynamically adjust exposure time and sensor gain, wherein the set of operations comprises:
collecting a first plurality of pixels based on a luma threshold and a first chroma threshold;
collecting a second plurality of pixels if the chroma associated with each of the second plurality of pixels is greater than a second chroma threshold;
   determining a first maximum gain based on at least the first plurality of pixels;
   determining a second maximum gain based on at least the second plurality of pixels; and
generating a correction gain based on a minimum of a plurality of values, the plurality of values comprising the first maximum and the second maximum; and
a memory coupled to the processing unit.

12. The integrated circuit of claim 11, wherein the first plurality of pixels comprises bright near grey pixels and the second plurality of pixels comprises high chroma pixels in the scene, the set of operations further comprising operations to increase brightness to a predetermined level of the near grey pixels without saturation and maintain the high chroma pixels away from saturation.

13. The integrated circuit of claim 11, wherein the set of operations includes a first subset of operations to convert the image from red, green, blue (RGB) to a YCbCr color space image.

14. The integrated circuit of claim 13, wherein the set of operations include a second subset of operations to collect bright near grey pixels and high chroma pixels in the YCbCr color space image.

15. The integrated circuit of claim 14, wherein the set of operations includes a third subset of operations to calculate a first chroma threshold (Th_Chroma1), a second chroma threshold (Th_Chroma2) and a luma threshold (Th_Luma) defined by $$\text{Max\_Chroma\_Value} = \max[\text{Sqrt}(Cb^2 + Cr^2)];$$

$$\text{Max\_Luma\_Value} = \max[Y];$$

$$\textit{Th}\_\text{Chroma1} = f1 * \text{Max\_Chroma\_Value};$$

$$\textit{Th}\_\text{Chroma2} = f2 * \text{Max\_Chroma\_Value}; \text{ and}$$

$$\textit{Th}\_\text{Luma} = f3 * \text{Max\_Luma\_Value};$$

where f1 and f2 are predetermined lower and upper percentages of the Max_Chroma_Value; f3 is a predetermined percentage of the Max_Luma_Value; the bright near grey pixels are those pixels in the YCbCr color space image which have a pixel chroma value less than the Th_Chroma1 and a pixel luma greater than the Th_Luma; and the high chroma pixels are those pixels in the YCbCr color space image that have a pixel chroma value that is greater than the Th_Chroma2.

16. The integrated circuit of claim 15, wherein the set of operations includes a fourth subset of operations to:
determine a maximum gain (G1) based on at least the bright near grey pixels defined by $$G1 = \max[Y \text{ of the bright near grey pixels}];$$

determine a maximum gain (G2) based on at least the high chroma pixels defined by $$G2 = \max[Y \text{ of the high chroma pixels}];$$

calculate a maximum gain (G3) defined by $$G3 = \text{a value that gives F5\% of an accumulated PDF of a luma histogram of the collected high chroma pixels,}$$

where F5% is a percentage of the accumulated PDF and PDF is a probability density function;
calculate a correction gain defined by $$\text{Correction Gain} = 255/\min[G1, G2, G3],$$

where min[G1, G2, G3] is the minimum of the G1, the G2 and the G3; and
apply the correction gain to every pixel in the YCbCr color space image.

17. The integrated circuit of claim 11, wherein the processing unit is a portion of a cellular phone, wireless device, wireless communications device, a video game console, a personal digital assistant (PDA), a laptop computer, or a video-enabled device.

18. A computer program product including a non-transitory computer readable medium having instructions for causing a computer to:
collect a first plurality of pixels based on a luma threshold and a first chroma threshold and collect a second plurality of pixels if the chroma associated with each of the second plurality of pixels is greater than a second chroma threshold;
   determine a first maximum gain based on at least the first plurality of pixels;
   determine a second maximum gain based on at least the second plurality of pixels;
generate a correction gain based on a minimum of a plurality of values, the plurality of values comprising the first maximum and the second maximum; and
dynamically adjust exposure time and sensor gain based on both the first and second plurality of pixels.

19. The computer program product of claim 18, wherein:
the first plurality of pixels comprises bright near grey pixels and the second plurality of pixels comprises high chroma pixels in the scene; and
the instructions to dynamically adjust exposure time and sensor gain includes instructions to cause the computer to increase brightness to a predetermined level of the near grey pixels without saturation and maintain the high chroma pixels away from saturation.

20. The computer program product of claim 19, wherein certain of the instructions cause the computer to convert the image from red, green, blue (RGB) to an YCbCr color space image.

21. The computer program product of claim 20, wherein certain of the instructions cause the computer to collect bright near grey pixels and high chroma pixels in the YCbCr color space image.

22. The computer program product of claim 21, wherein the instruction to determine the luma and chroma further includes instructions to cause the computer to calculate a first chroma threshold (Th_Chroma1), a second chroma threshold (Th_Chroma2) and a luma threshold (Th_Luma) defined by Max_Chroma_Value=max[Sqrt($Cb^2+Cr^2$)];

Max_Luma_Value=max[$Y$];

Th_Chroma1 =$f1$*Max_Chroma_Value;

Th_Chroma2=$f2$*Max_Chroma_Value; and

Th_Luma=$f3$*Max_Luma_Value;

where f1 and f2 are predetermined lower and upper percentages of the Max_Chroma_Value; f3 is a predetermined percentage of the Max_Luma_Value; the bright near grey pixels are those pixels in the YCbCr color space image which have a pixel chroma value less than the Th_Chroma1 and a pixel luma greater than the Th_Luma; and the high chroma pixels are those pixels in the YCbCr color space image that have a pixel chroma value that is greater than the Th_Chroma2.

23. The computer program product of claim 22, wherein the instructions to dynamically adjust exposure time and sensor gain includes instructions to cause the computer to:

determine a maximum gain (G1) based on at least the bright near grey pixels defined by G1=max[Y of the bright near grey pixels];

determine a maximum gain (G2) based on at least the high chroma pixels defined by G2=max[Y of the high chroma pixels];

calculate a maximum gain (G3) defined by

G3=a value that gives F5% of an accumulated PDF of a luma histogram of the collected high chroma pixels, where F5% is a percentage of the accumulated PDF and PDF is a probability density function;
calculate a correction gain defined by Correction Gain=255/min[G1, G2, G3], where min[G1, G2, G3] is the minimum of the G1, the G2 and the G3; and apply the correction gain to every pixel in the YCbCr color space image.

24. A wireless device comprising:
determining means for determining luma and chroma information from a scene of an image;
collecting means for collecting a first plurality of pixels based on a luma threshold and a first chroma threshold and means for collecting a second plurality of pixels if the chroma associated with each of the second plurality of pixels is greater than a second chroma threshold;
determining means for determining a first maximum gain based on at least the first plurality of pixels;
determining means for determining a second maximum gain based on at least the second plurality of pixels;
generating means for generating a correction gain based on a minimum of a plurality of values, the plurality of values comprising the first maximum and the second maximum; and
adjusting means for dynamically adjusting exposure time and sensor gain based on both the luma and chroma information determined from the scene.

25. The wireless device of claim 24, wherein:
the first plurality of pixels comprises bright near grey pixels and the second plurality of pixels comprises high chroma pixels in the scene; and
the adjusting means includes means for increasing brightness to a predetermined level of the near grey pixels without saturation and maintain the high chroma pixels away from saturation.

26. The wireless device of claim 24, wherein said the wireless device is a cellular phone, wireless device, wireless communications device, a video game console, a personal digital assistant (PDA), a laptop computer, or a video-enabled device.

27. A processor comprising:
determining means for determining luma and chroma information from a scene of an image;
collecting means for collecting a first plurality of pixels based on a luma threshold and a first chroma threshold and collecting means for collecting a second plurality of pixels if the chroma associated with each of the second plurality of pixels is greater than a second chroma threshold;
determining means for determining a first maximum gain based on at least the first plurality of pixels;
determining means for determining a second maximum gain based on at least the second plurality of pixels;
generating means for generating a correction gain based on a minimum of a plurality of values, the plurality of values comprising the first maximum and the second maximum; and
adjusting means for dynamically adjusting exposure time and sensor gain based on both the luma and chroma information determined from the scene.

28. The processor of claim 27, wherein:
the first plurality of pixels comprises bright near grey pixels and the second plurality of pixels comprises high chroma pixels in the scene.

29. The processor of claim 27, wherein:
the adjusting means includes means for increasing brightness to a predetermined level of the near grey pixels without saturation and maintain the high chroma pixels away from saturation.

30. The processor of claim 27, wherein the processor is a portion of a cellular phone, wireless device, wireless communications device, a video game console, a personal digital assistant (PDA), a laptop computer, or a video-enabled device.

31. A method comprising:
determining luma and chroma information from a scene of an image;
collecting a first plurality of pixels based on a luma threshold and a first chroma threshold and collecting a second plurality of pixels if the chroma associated with each of the second plurality of pixels is greater than a second chroma threshold;
determining a first maximum gain based on at least the first plurality of pixels;
determining a second maximum gain based on at least the second plurality of pixels;
generating a correction gain based on a minimum of a plurality of values, the plurality of values comprising the first maximum and the second maximum; and
dynamically adjusting exposure time and sensor gain based on both the luma and chroma information determined from the scene.

32. The method of claim 31, wherein first plurality of pixels comprises bright near grey pixels and the second plurality of pixels comprises high chroma pixels in the scene.

33. The method of claim 32, wherein the adjusting step includes increasing brightness to a predetermined level of the near grey pixels without saturation and maintain the high chroma pixels away from saturation.

* * * * *